May 19, 1953 G. F. BELLAIRS ET AL 2,639,417

SELECTOR

Filed Jan. 24, 1948 2 Sheets-Sheet 1

Inventors
Guy ffarington Bellairs
John Charles Ireland
by Dezso Steinherz
Attorney

SELECTOR

Filed Jan. 24, 1948 2 Sheets-Sheet 2

Inventors
Guy Ffarington Bellairs
John Charles Ireland
by Dezsoe Steinberg
Attorney Patented May 19, 1953 2,639,417

UNITED STATES PATENT OFFICE 2,639,417

SELECTOR

Guy ffarington Bellairs, London, and John Charles Ireland, Tunbridge Wells, England, assignors to British Telecommunications Research Limited, Taplow, England, a British company Application January 24, 1948, Serial No. 4,146
In Great Britain January 27, 1947

6 Claims. (Cl. 340—171)

This invention relates to frequency selectors for use in automatic telecommunication systems.

It has been proposed in order to obtain any of a large number of possible frequencies from a limited number of sources of waves of fixed frequencies to arrange such sources so as to supply waves of frequencies in sets, each set being composed of a number of fixed frequencies equally spaced in arithmetical progression the frequency range of the second and any subsequent set being within the frequency spacing of the preceding set and to provide manually controlled means for selecting one frequency from each set and mixing such frequencies so as to obtain a resultant single combination frequency. By the frequency range of a set is meant the difference between the highest and lowest frequencies in that set.

Two, three, four or more sets of frequencies may be made available.

One object of the invention is to provide a frequency generator which generates a wave having a frequency distinctive of a particular combination of signals transmitted thereto. Another object of the invention is to provide a frequency selector for use in a telecommunication system embodying a frequency generator as described above for producing a single combination wave for the purpose of testing a communication channel in a transmission path and for controlling the establishment of a connection to and over said transmission path.

In the case of the frequency selector being arranged to respond to three series of impulses three tenway switching or selecting devices are provided so that the final output will consist of a wave having any one of 1000 particular frequencies according to the various possible positions of the ten-way switches.

Further stages of selection may of course be added to the extent the frequency allocation permits.

The various sets of frequencies required might be derived from frequency multiplying devices locked to a common master oscillator.

The frequencies may be so chosen that unwanted modulation products do not appear in the output of the frequency generator.

The relation between a set of frequencies and the next set of lower frequency spacing is preferably that the spacing of the former exceeds the difference between the highest and lowest frequencies of the latter by the frequency spacing of the latter.

The invention more especially has application in telephone or like systems wherein each communication channel has associated a fixed frequency and in order to establish communication to a wanted communication channel it is necessary to provide a wave having the associated fixed frequency.

According to a further feature of the invention, in the case where a wanted station has associated a plurality of communication channels characterised by a progression of equally spaced frequencies it will be possible to arrange that should a frequency selected by the above method correspond to an engaged communication channel an appropriate change is automatically made in the selected frequency of one of the sets so that the frequency of another communication channel to the wanted station is provided and if this too is engaged the process may be repeated until a free communication channel is found or until all channels have been tasted and found busy.

Thus the impulse responsive means when operated may serve to initiate the operation of an automatically hunting frequency selector to establish communication with a selector channel independently of the impulse responsive means.

The invention will be better understood from the following description of methods of carrying it into effect, described with reference to the accompanying drawings.

Figure 1:
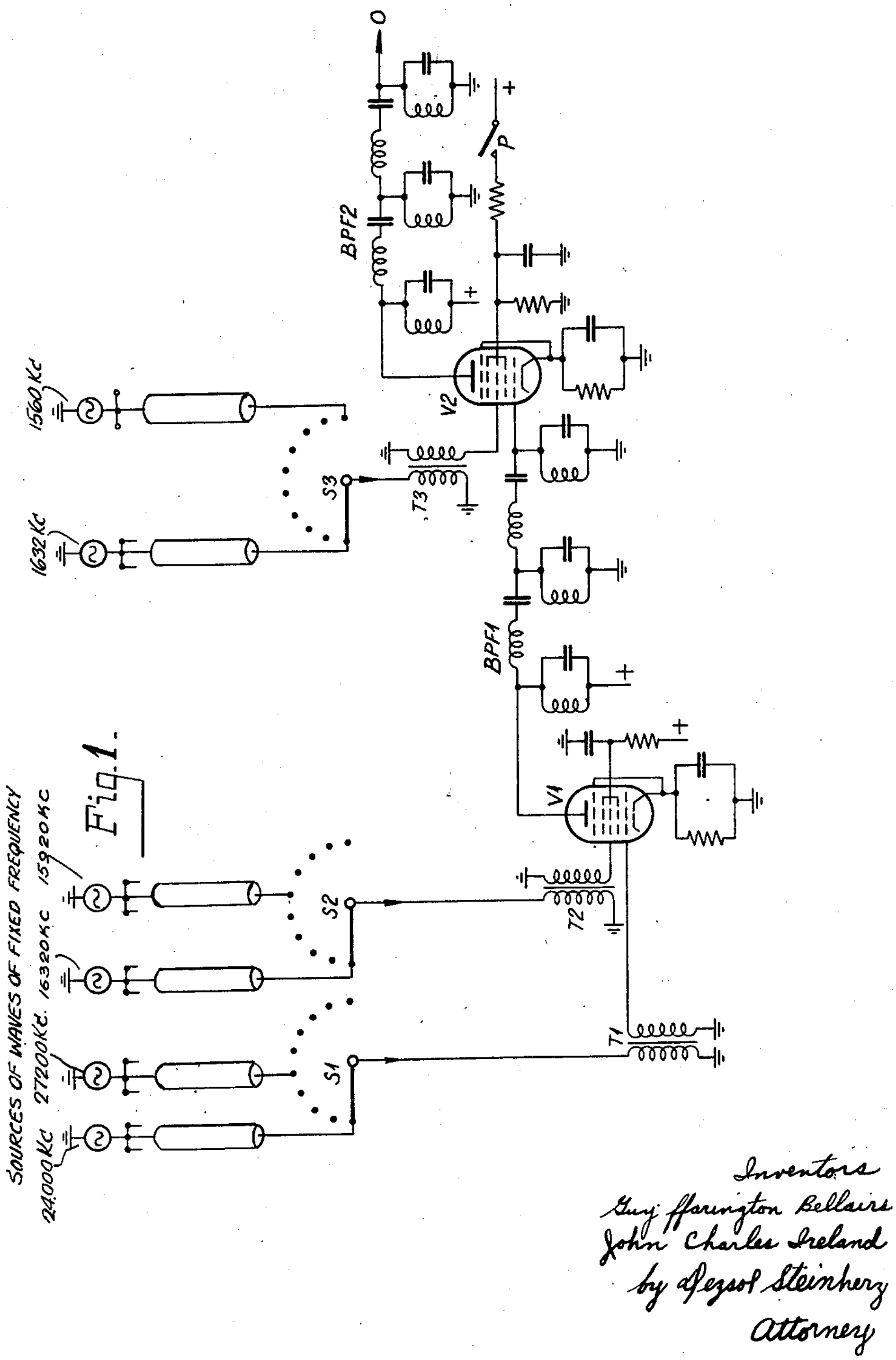
Fig. 1 shows circuit details of an important component of the invention which in itself is not broadly novel.

In Fig. 1, two of the selected frequencies are obtained by setting the ten-point switches S1 and S2 (for instance as described in connection with Figure 2) to appropriate positions each of the ten positions being supplied with a wave of discrete frequency, the frequencies of the ten waves connected to the ten positions of each switch forming a set of the nature previously described. The selected waves are fed respectively via transformers T1 and T2 to a first mixer which is a hexode valve mixer V1.

The output from V1 is fed to a band pass filter BPF1 which selects therefrom the desired single combination frequency which is desired and the output of the band pass filter is extended to the first control grid of a hexode valve mixer V2.

A third selected frequency derived from the switch S3 is supplied through a transformer T3 to the second control grid of the mixer valve V2.

The output of the mixer valve V2 is fed to a band pass filter BPF2 and hence to an output connection O when a suitable contact P in the screen grid supply circuit of the mixer valve V2 is closed.

Figure 2:
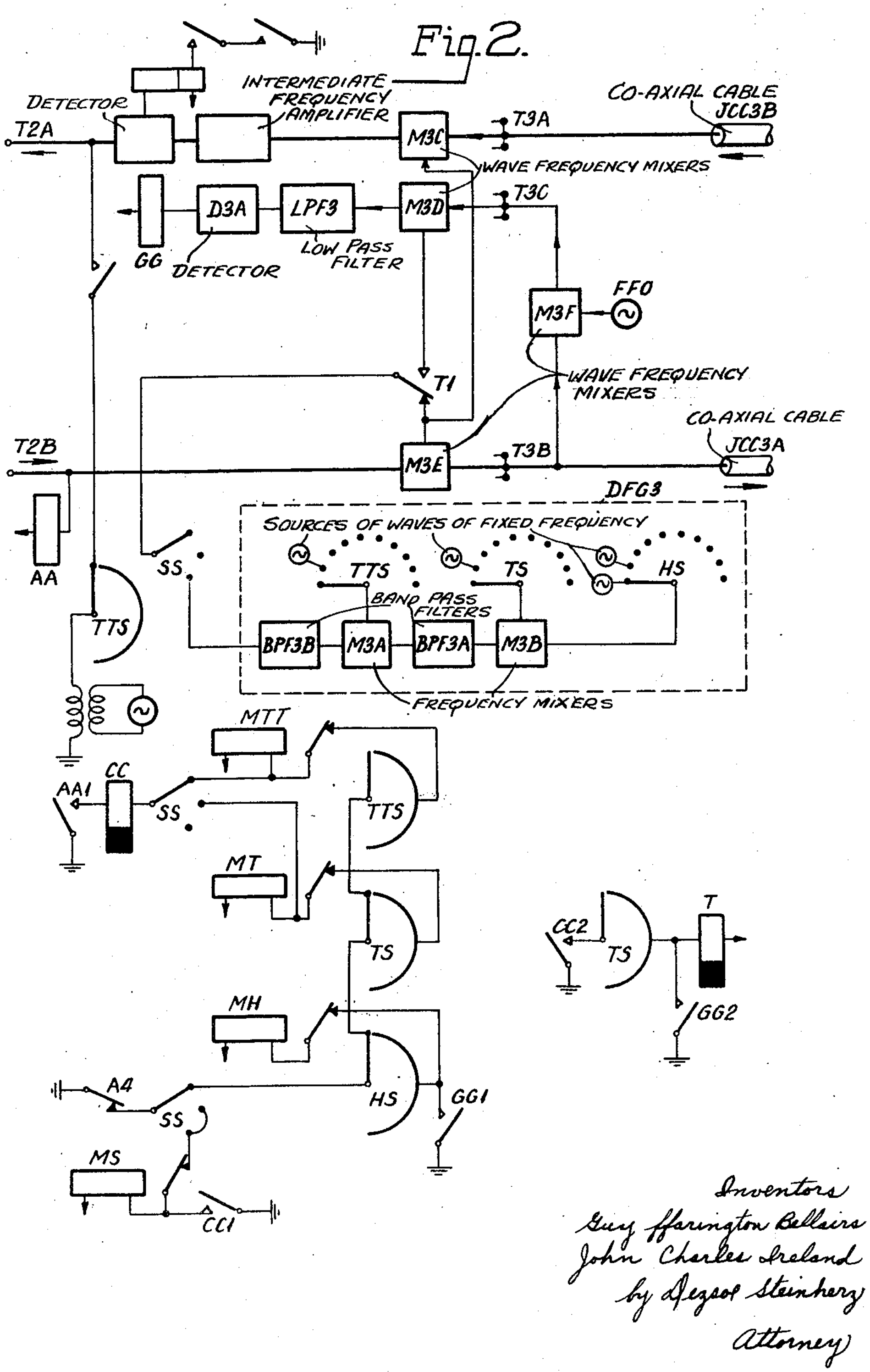
Fig. 2 shows the invention as applied for use in a telephone system of the kind described in our copending application Serial No. 4,143, filed January 24, 1948.

The present invention is illustrated in Fig. 2, which figure is also shown in our copending application Serial No. 4,143, filed January 24, 1948, now Patent No. 2,607,853, issued August 19, 1952, and is the circuit of an exchange selector as suitable for use in a telecommunication system.

It is assumed that suitable trains of impulses are received by the relay AA over line T2B corresponding to the hundreds, tens and unit digit of a wanted substation number. In the arrangement shown only the pulses corresponding to the hundred and tons digits will be utilised for providing a combination frequency and this frequency will be variable by a third stage of frequency selection which will be a hunting stage. Such an arrangement would correspond to a hypothetical system in which each subscriber had ten PBX lines.

In Figure 2 the equipment shown in the dotted rectangle DFG3 corresponds to that shown in Figure 1 by reference to which the corresponding components will be readily apparent.

When impulses are received, relay AA operates intermittently and completes at AA1 a circuit for change-over relay CC and the magnet MTT through the first wiper of a steering switch SS in normal position. CC operates and holds up only during the trains of impulses. At CC1 it completes the circuit for magnet MS of steering switch SS. MTT responds to the impulses and steps the wipers of the hundreds switch TTS in accordance with the first digit dialled. This switch may be a three bank rotary switch, the first wiper of which steps over ten contacts to each of which is connected one of the sets of sources of waves having equally spaced frequencies, which may be as follows:

| Home contact, disconnected. | Kilocycles |
|---|---|
| 1st contact | 24,000 |
| 2nd contact | 24,800 |
| 3rd contact | 25,600 |
| 4th contact | 26,400 |
| 5th contact | 27,200 |
| 6th contact | 28,000 |
| 7th contact | 28,800 |
| 8th contact | 29,600 |
| 9th contact | 30,400 |
| 10th contact | 31,200 |

The second wiper moves over an off normal contact strip, to provide a homing circuit for the switch TTS.

When the first series of impulses cease the first wiper of TTS rests on a contact corresponding to the first digit and relay CC releases shortly after, opening the circuit of MS at CC1 to cause the wipers of the steering switch SS to advance one step so that the impulsing circuit is now connected to the magnet MT of the thousands switch TS. The next series of impulses therefore operate MT and CC. Magnet MT advances the wipers of the switch TS to the position corresponding to the tens digit, MS being energised by contact CC1 as before. The switch TS corresponds generally to the switch TTS but the frequencies respectively connected to the first bank contacts will be:

| Home contact, disconnected. | Kilocycles |
|---|---|
| 1st contact | 16,320 |
| 2nd contact | 16,240 |
| 3rd contact | 16,160 |
| 4th contact | 16,080 |
| 5th contact | 16,000 |
| 6th contact | 15,920 |
| 7th contact | 15,840 |
| 8th contact | 15,760 |
| 9th contact | 15,680 |
| 10th contact | 15,600 |

At the end of the second digit, MS releases and advances the switch SS to the third position, so as to interrupt the impulsing circuit.

The switches TTS and TS constitute with hunting switch HS, a decade frequency generator as previously described, so that frequencies selected by the left-hand wipers of HS and TS are led to mixer M3B.

The switch HS is of the same kind as TTS and TS, but in this application the 1st contact to which frequencies are connected is the home contact. The frequencies connected to the respective contacts of the first contact bank HS are:

| | Kilocycles |
|---|---|
| Home or 1st contact | 1632 |
| 2nd contact | 1624 |
| 3rd contact | 1616 |
| 4th contact | 1608 |
| 5th contact | 1600 |
| 6th contact | 1592 |
| 7th contact | 1584 |
| 8th contact | 1576 |
| 9th contact | 1568 |
| 10th contact | 1560 |

When CC operated for the second digit, it completed at CC2, immediately the wipers TS had left the normal position, a circuit for slow release relay T. Relay T on energising operates contact T1 so that when the wipers of the switch SS were stepped to the third position a circuit was completed from the mixer M3D over T1 front contact, contact and wiper of switch SS in third position to the output of the decade frequency generator thereby completing a busy test circuit from BPF3B, SS in third position, T1 operated to M3D. Consequently this busy test circuit only becomes effective when the relay CC de-energises at the end of the second digit.

The switch HS has a frequency connected to the normal contact which when mixed with the frequency connected up by TS to M3B gives resultant frequencies of which the sum frequency passes through BPF3A to M3A where it mixes with the frequency from switch TTS and the difference (say) passes through BPF3B to the test circuit; this latter frequency is designed to correspond to the first of the selected group of carrier frequencies which lead to the wanted destination.

It is assumed that there are ten carrier frequencies in a group corresponding to the capacity of the switch HS, but of course there may be a different number if desired, provided that the whole range of carrier frequencies is no greater than the difference between the frequencies selected by the switch TS on successive steps.

Terminals T3A and B are multiplied to other exchange selectors and are connected to the cable JCC3A leading to other exchanges and to a lead (not shown) leading to other selectors in the local exchange. Terminals T3C are also multiplied to other exchange selectors and are connected to the output of a common mixer M3F which is fed from an oscillator FFO with a fixed frequency, say 500 cycles, and is also connected to terminals T3B. Consequently if there is any carrier frequency present on the cables or lines with which the terminals T3B are associated, then the frequencies on terminals T3C will be the sum and difference of the carrier frequency on T3B and the fixed frequency. If therefore the carrier frequency is present on T3B corresponding to the frequency applied to M3D over the busy test circuit as described, i. e. the first of the selected group of carrier frequencies indicating that the communication channel first tested is busy there will be an output from M3D corresponding to the fixed frequency of oscillator FFO say 500 cycles which passing to detector D3A through the low pass filter LPF3 will cause the relay GG to operate. Relay GG at contact GG1 completes a circuit for magnet MH through its own interrupting contacts and a maintaining circuit for relay T at GG2. The switch HS will therefore step and advance the wipers step-by-step until a carrier frequency is placed on the test circuit for which there is no corresponding frequency on the cable or line being tested.

If GG does not operate or after it has ceased to operate the circuit for relay T is opened and consequently this relay will release after a short interval and at contact T1 front contact transfers the frequency output of BPF3B from M3D to M3C and M3E rendering T3B busy with respect to the particular carrier frequency found and M3E effective to modulate audio frequency currents from T2B with the desired carrier frequency, while M3C is rendered effective to demodulate modulated carrier frequencies received over the selected channel.

The equipment can be restored by the closing of contact A4 of a relay A (not shown) whereupon magnet MH is operated over earth, contact A4 second wiper of HS in an off-normal position, magnet MH, battery. As magnet MH is self-interrupting it steps the first wiper of the switch HS round to its normal position, when the energising circuit for magnet MH is broken. When the first wiper of the switch HS reaches its normal position an energising circuit is closed for magnet MT, over; earth, contact A4, second wiper of HS in normal position, second wiper of TS in off-normal position, magnet MT, battery. As magnet MT operates it disconnects its own circuit, stepping on of the wipers of TS combines until they reach the normal position. When the second wiper of TS reaches its normal position an energising circuit is closed for magnet MTT over earth, contact A4, second wiper of HS in normal position, second wiper of TS in normal position, second wiper of TTS in off-normal position, magnet MTT, battery. MTT thereafter operates and restores until the wipers of switch TTS are restored to their normal position.

We claim:

1. A frequency selector for use in a telecommunication system having input and output terminals, a variable frequency generator comprising a first series of sources of fixed frequency waves, the sources of said first series being designed to supply waves having distinctive frequencies which are separated by amounts of one value, a second series of sources of fixed frequency waves, the sources of said second series being designed to supply waves having distinctive frequencies which are separated by amounts of another value, the amount between the lowest and highest frequency of said second series of sources being less than any amount separating the frequencies of said first series, wave mixing means, a first selecting device by which any one of said first series of sources may be connected to said mixing means, a second selecting device by which any one of said second series of sources may be connected to said mixing means, filter means for restricting the output from said mixer to a resultant wave of a single frequency, which frequency is a distinctive combination of the frequencies of the waves selected by said selecting devices and distinct from any of the frequencies of the first and second series of sources, means for connecting said resultant wave to said output terminals and control means operable over and responsive to successive signals received at said input terminals by which the first and second selecting devices are operated in turn whereby the wave from the output to said mixer is directly distinctive of the combination of signals received by said control means, means responsive to signals received at said input terminals for successively operating said selecting devices, testing means connected to said output terminals, means responsive to the cessation of said signals for applying the resultant wave derived from said frequency generator to said testing means, means forming part of said testing means adapted to respond if said resultant wave and a wave present on said output terminals cooperate to produce a wave of a given frequency, and means operable on the cessation of said signals if said testing means fail to respond for causing said resultant wave to be applied to said output terminals to provide carrier currents for communication passing between said input and output terminals.

2. A frequency selector for use in a telecommunication system having input and output terminals, a variable frequency generator comprising a first series of sources of fixed frequency waves, the sources of said first series being designed to supply waves having distinctive frequencies which are separated by amounts of one value, a second series of sources of fixed frequency waves, the sources of said second series being designed to supply waves having distinctive frequencies which are separated by amounts of another value, the amount between the lowest and highest frequency of said second series of sources being less than any amount separating the frequencies of said first series, wave mixing means, a first selecting device by which any one of said first series of sources may be connected to said mixing means, a second selecting device by which any one of said second series of sources may be connected to said mixing means, filter means for restricting the output from said mixer to a resultant wave of a single frequency, which frequency is a distinctive combination of the frequencies of the waves selected by said selecting devices and distinct from any of the frequencies of the first and second series of sources, means responsive to successive series of impulses received at said input terminals by which the first and second stepping switches are operated in turn to cause a resultant wave to be generated distinctive of the combination of numbers of impulses in each of said series of impulses, testing means connected to said output terminals, means responsive to the cessation of said impulses for applying the resultant wave derived from said frequency generator to said testing means, means forming part of said testing means adapted to respond if said resultant wave and a wave present on said output terminals cooperate to produce a wave of a given frequency, and means operable on the cessation of said impulses if said testing means fail to respond for causing said resultant wave to be applied to said output terminals to provide carrier currents for communication passing between said input and output terminals.

3. A frequency selector as claimed in claim 2 in which a change-over device is provided for transferring the control by the impulses for the first stepping switch to the second stepping switch.

4. A frequency selector for use in a telecommunication system having input terminals and output terminals, and comprising a first series of sources of fixed frequency waves, the sources of said first series being designed to supply waves having distinctive frequencies which are separated by amounts of one value, a second series of sources of fixed frequency waves, the waves of said second series being designed to supply waves having distinctive frequencies which are separated by amounts of another value, the amount between the lowest and highest frequency of said second series of sources being less than any amount separating the frequencies of said first series of sources, a first wave mixing means, a first selecting device, a first control means connected to said input terminals for effecting the operation of said first selecting device to connect one of said first series of sources to said mixing means, a second selecting device, a change-over device operable when the operation of the first selecting device is completed, a second control means connected to said input terminals by said change-over device for effecting the operation of said second selecting device to connect a predetermined one of said second series of sources to said mixing means, filter means connected to the outlet of said first mixing means to select therefrom a wave of a single resultant frequency, which frequency is a distinctive combination of the frequency of the waves selected by said switching devices, a second wave mixing means to which the outlet of said first mixing means and the output terminals are connected, wave responding means controlled from said second wave mixing means, which responding means operate when the said resultant wave and a wave present on said output terminals cooperate to provide a wave having a frequency of a given value, a third series of sources of said frequency waves each having distinctive frequencies separated by amounts of a third value and means controlled by said wave responding means for causing said third series of sources to be selected successively, a third mixing means by which the waves are successively applied to said first mixing means to cause the frequency of the resultant wave to be changed in steps within the smallest of said amounts by which frequencies of said second series of frequencies are separated until the wave responding means ceases to operate, means responsive to the cessation of said selecting means to cause the resultant wave to be applied to the communication channel and means responsive to the cessation of operation of said wave responding means to cause the final resultant wave to be applied to said output terminals to provide carrier currents for communications passing between said input and output terminals.

5. In a telecommunication system a frequency selector having input and output terminals comprising a source providing waves of a distinctive frequency, a first series of sources of fixed frequency waves, a second series of sources of fixed frequency waves, wave mixing means, a first impulse responsive device controllable from said input terminals by which one of the sources from said first series is connected to said mixing means, a second impulse responsive device by which one of the sources from said second series is connected to said mixing means, and filter means connected to the outlet of said mixer by which a wave of a resultant single frequency is derived from said selected sources, connecting means by which the said resultant wave is caused to cooperate with waves presented to said output terminals, a wave responsive device arranged to respond when the said resultant wave and a wave presented to said output terminals cooperate to produce a wave having a frequency of a given value and means operable if said wave responsive device fails to operate to cause the final resultant wave to be applied to said output terminals to provide carrier currents for communications passing between said input and output terminals.

6. A frequency selector as claimed in claim 5 comprising a third series of fixed frequency sources and automatic switching means operated by said wave responsive device if a wave is present on the output terminals which in cooperation with said resultant frequency produces a wave having a frequency of a given value to bring about the generation of waves of resultant frequencies of progressively changing values until a resultant wave frequency is produced not having such a cooperation with waves on the output terminals.

GUY FFARINGTON BELLAIRS.
JOHN CHARLES IRELAND.

References Cited in the file of this patent

UNITED STATES PATENTS

| Number | Name | Date |
|---|---|---|
| 1,678,203 | Smythe | July 24, 1928 |
| 2,098,331 | Bowman | Nov. 9, 1937 |
| 2,116,372 | Weld | May 3, 1938 |
| 2,155,176 | Wicks | Apr. 18, 1939 |
| 2,206,538 | Rhodes | July 2, 1940 |
| 2,326,737 | Andrews | Aug. 17, 1943 |
| 2,426,580 | O'Brien | Aug. 26, 1947 |
| 2,440,239 | Almquist | Apr. 27, 1948 |
| 2,483,445 | Talley | Oct. 4, 1949 |
| 2,548,684 | Roth | Apr. 10, 1951 |